United States Patent [19]

Goyert et al.

[11] Patent Number: 4,521,582
[45] Date of Patent: Jun. 4, 1985

[54] THERMOPLASTIC POLYURETHANES HAVING A HIGH HEAT STABILITY, BASED ON NAPHTHYLENE DIISOCYANATE, THEIR PRODUCTION AND THEIR USE

[75] Inventors: Wilhelm Goyert; Jürgen Winkler, both of Leverkusen, Fed. Rep. of Germany

[73] Assignee: Bayer Aktiengesellschaft, Leverkusen, Fed. Rep. of Germany

[21] Appl. No.: 637,242

[22] Filed: Aug. 2, 1984

[30] Foreign Application Priority Data

Aug. 18, 1983 [DE] Fed. Rep. of Germany ....... 3329775

[51] Int. Cl.$^3$ .................. C08G 18/76; C08G 18/32
[52] U.S. Cl. ........................................ 528/67; 528/65; 528/74
[58] Field of Search ............................. 528/67, 74, 65

[56] References Cited

U.S. PATENT DOCUMENTS

| | | | |
|---|---|---|---|
| 2,879,233 | 3/1959 | Pace | 528/67 |
| 3,769,265 | 10/1973 | Groegler et al. | 528/74 |
| 3,875,118 | 4/1975 | Meisert et al. | 260/75 NP |
| 3,963,656 | 6/1976 | Meisert et al. | 260/18 TN |
| 4,330,656 | 5/1982 | Groegler et al. | 528/74 |
| 4,413,111 | 11/1983 | Markush et al. | 528/59 |

FOREIGN PATENT DOCUMENTS 3028501 4/1982 Fed. Rep. of Germany .

Primary Examiner—Herbert S. Cockeram
Attorney, Agent, or Firm—Gene Harsh; Joseph C. Gil; Aron Preis

[57] ABSTRACT

This invention relates to novel, thermoplastically processible, branched polyurethanes based on naphthylene-1,5-diisocyanate which have good heat stability and are obtained by the claimed process. In the first stage of the process long-chain polyols are reacted with a first diisocyanate which is any diisocyanate other than naphthylene-1,5-diisocyanate in substoichiometric NCO quantities to produce an OH prepolymer which is then lengthened with excess napthylene-1,5-diisocyanate and with a chain lengthening mixture of short-chain diols and triols and/or polyols in specific ratios. The resulting semi-rigid, thermoplastic polyurethane elastomers are characterized by their good dimensional stability under heat, a good rebound elasticity (even at relatively high temperatures), acceptable low temperature flexibility and an outstanding resistance to wear which properties render them useful for the production of hydraulic seals, seals, rollers, buffers, tubes, bellows, plugs, cylinders, couplings and similar moldings.

22 Claims, 3 Drawing Figures

4,521,582

THERMOPLASTIC POLYURETHANES HAVING A HIGH HEAT STABILITY, BASED ON NAPHTHYLENE DIISOCYANATE, THEIR PRODUCTION AND THEIR USE

FIELD OF THE INVENTION

The invention relates to thermoplastic polyurethanes and to a process for their preparation; in particular the polyurethanes are based on naphthylene-1,5-diisocyanate.

SUMMARY OF THE INVENTION

This invention relates to novel, thermoplastically processible, branched polyurethanes based on naphthylene-1,5-diisocyanate which have good heat stability and are obtained by the claimed process. In the first stage of the process long-chain polyols are reacted with a first diisocyanate which is any diisocyanate other than naphthylene-1,5-diisocyanate in sub-stoichiometric NCO quantities to produce an OH prepolymer which is then lengthened with excess naphthylene-1,5-diisocyanate and with a chain lengthening mixture of short-chain diols and triols and/or polyols in specific ratios. The resulting semi-rigid, thermoplastic polyurethane elastomers are characterized by their good dimensional stability under heat, a good rebound resiliency (even at relatively high temperatures), acceptable low temperature Flexibility and an outstanding resistance to wear which properties render them useful for the production of hydraulic seals, seals, rollers, buffers, tubes, bellows, plugs, cylinders, couplings and similar moldings

DESCRIPTION OF THE PRIOR ART

Thermoplastic urethane elastomers are generally produced on a 4,4'-diisocyanatodiphenylmethane (MDI) basis. These elastomers do not have a good return capability at elevated straining temperatures of from about 80° to 100° C. Elastomers which have a high return capability and good dynamic properties within this temperature range may be produced as cast elastomers based on naphthylene-1,5-diisocyanate, but in general, such elastomers cannot be shaped thermoplastically or may be shaped only with difficulty in the case of very flexible elastomers. That is why thermoplastic polyurethanes based on naphthylene-1,5-diisocyanate are still not available on the market. However, a thermoplastic workability of polyurethane elastomers is preferred for very many purposes of use before the (reaction) casting process.

DE-OS No. 2,248,382 claims a thermoplastic polyurethane elastomer based on diphenylmethane diisocyanate, for the production of which, in a first reaction stage, an OH prepolymer is formed which is obtained by reacting relatively high molecular weight polyhydroxyl compounds with toluylene diisocyanate or hexamethane diisocyanate. This OH prepolymer is then reacted with excess quantities of 4,4'-diisocyanatodiphenylmethane and glycols which have a molecular weight of less than 500, to produce a thermoplastic polyurethane. DE-OS No. 3,028,501 (EP-A No. 44969) describes thermoplastically processible polyurethane elastomers which are synthesized by the reaction of certain relatively high molecular weight mixed polyester diols, based on succinic, glutaric and adipic acid, organic diisocyanates and difunctional chain lengthening agents, with the simultaneous use of tri- to hexafunctional cross-linking agents. However, these polyurethane elastomers which are synthesized in a partially branched condition are not produced with the simultaneous use of naphthylene diisocyanate, and thus do not exhibit high-grade elastic properties at elevated temperatures.

DETAILED DESCRIPTION OF THE INVENTION

Figure 1:
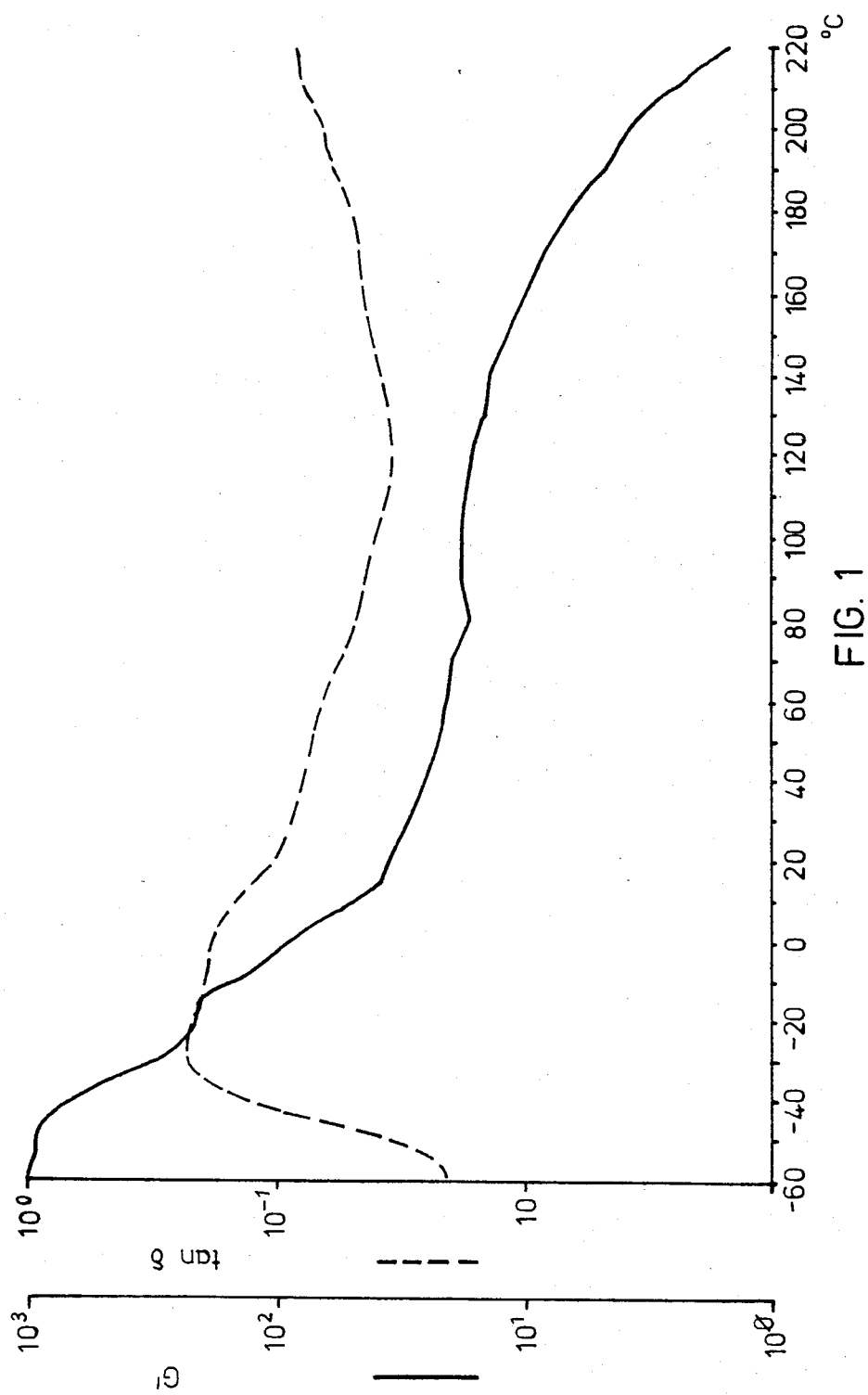

Surprisingly, it has now been found that it is possible to produce thermoplastically processible polyurethane elastomers based on naphthylene-1,5-diisocyanate by using relatively high molecular weight polyol compounds which are reacted with sub-stoichiometric quantities of diisocyanates, preferably diphenylmethane diisocyanates, toluylene diisocyanates, dicyclohexyl methane diisocyanates or hexane diisocyanate to produce an OH prepolymer which is then reacted with excess quantities of naphthylene-1,5-diisocyanate and a mixture of relatively short-chain diols and tri- and/or polyols to produce the elastomer. These new thermoplasts exhibit a high elastic recovery and a high modulus, even at elevated temperatures, for example at from 80° to 100° C., and such thermoplastically processible polyurethanes also exhibit an outstanding abrasion resistance.

The present invention is also directed to a process for the production of novel, thermoplastically processible polyurethane elastomers based on naphthylene-1,5-diisocyanate which elastomers are characterized by their high elastic recovery and high elastic properties even at elevated temperatures. The process comprises a reaction of substantially linear, relatively high molecular weight polyhydroxyl compounds having molecular weights of from 550 to 10,000 with sub-stoichiometric quantities of a "first diisocyanate" and a further reaction of the thus-produced OH prepolymer with a naphthylene-1,5-diisocyanate and low molecular weight di- and tri- and/or polyols, optionally with the simultaneous introduction of conventional antioxidants, UV absorbers, light protection agents, hydrolysis protection agents, mold-release waxes, other conventional stabilizers, auxiliaries, fillers and dyes. The process is further characterized in that (A) the relatively high molecular weight, substantially linear polyhydroxyl compounds are pre-lengthened with a first diisocyanate which is any diisocyanate other than 1,5-diisocyanate, preferably diphenylmethane diisocyanates, toluylene diisocyanates, dicyclohexylmethane diisocyanates or hexane diisocyanate, more preferably diphenylmethane-4,4'-diisocyanate, to produce an OH prepolymer, preferably in an OH:NCO equivalent ratio of from 4:1 to 1.33:1, more preferably from 3:1 to 1.5:1 and in particular from 2.5:1 to 1.75:1, and (B) the OH prepolymer which is produced in stage (A) is reacted with naphthylene-1,5-diisocyanate, and with (C) a diol/polyol chain lengthener mixture (C), wherein diols and polyols have molecular weights of from 62 to 500, preferably from 62 to 254, to produce the polyurethane. The chain lengthener mixture is further characterized in that from 70 to 92 equivalent %, preferably from 75 to 90 equivalent % of the OH groups originate from diols, and in that these diols contain as the main component any of hydroquinone-di-(β-hydroxyethyl ether), butane diol-1,4 and hexane diol-1,6, and when butane diol-1,4 or hexane diol-1,6 is the main component, they are used in diol mixtures which contain at least 15 equivalent % to at the most half the diol-OH equivalent % of co-diols having a molecular weight in the range of from 62 to 500, preferably 62 to 254, said co-diols are preferably straight- or branched-chain diols which optionally contain ether and/or ester groups, more preferably hexane diol-1,6 or butane diol-1,4 or ethylene glycol or diethylene glycol, and from 30 to 8, preferably from 25 to 10 equivalent % of the OH groups originate from tri- and/or higher functional polyols, preferably trifunctional polyols, and more preferably trimethylol propane.

This invention also provides thermoplastically processible elastomers which are produced according to the above-mentioned process, and it provides the use thereof in the production of moldings, such as hydraulic seals, seals, rollers, buffers, tubes, bellows, plugs, cylinders, cuppings and similar moldings, by thermoplastic shaping.

It has been found that it is only possible to produce thermoplastic polyurethane elastomers which may be processed satisfactorily and within adequately wide limits by the selected combination of pre-lengthening with the specific diisocyanates to produce the OH prepolymer, the use of naphthylene diisocyanate as the characteristic aromatic polyisocyanate and the use of a specific chain lengthener mixture of di- and polyols in the stated ratio. These thermoplastic polyurethane elastomers comply with the required property profile of the combination of processibility and good elastic values even at elevated temperatures, simultaneously with excellent abrasion values and tear propagation resistances.

The following are included among the suitable relatively high molecular weight, preferably substantially linear polyols having molecular weights of from 550 to 10,000, preferably from 800 to 6,000: virtually all known polyhydroxyl compounds preferably those having a functionality of two such as polyesters, polylactones, polyethers, polythioethers, polyester amides, polycarbonates, polyacetals, vinyl polymers, for example polybutadiene diols or polyhydroxyl compounds which already contain urethane or urea groups optionally modified natural polyols such as sugar alcohols and - in minor quantities of less than 15 weight % also relatively high molecular polyols and compounds containing Zerewitinoff-active groups capable of reacting with isocyanates, for example compounds containing amino, carboxyl or thiol groups such as relatively high molecular aromatic di- or poly-amino compounds.

Suitable compounds are known in the art and are described in detail in, for example, DE-OS Nos. 2,302,564; 2,423,764; 2,549,372: 2,402,840 and 2,920,501 and in DE-AS No. 2,457,387, all incorporated herein by reference. These preferred bifunctional compounds may optionally be used in combination with minor quantities, preferably up to 10%, of trifunctional analogs thereof.

The following polyhydroxyl compounds are preferred: substantially bifunctional polyesters containing hydroxyl groups, produced from diols and adipic acid, hydroxyl polycarbonates, hydroxyl caprolactones, hydroxyl-polytetrahydrofurans or hydroxy polyethers based on polyethylene oxide and/or polypropylene oxide, and corresponding mixed ethers produced from such components. The following are particularly preferred: polyesters produced from diols and adipic acid and polycaprolactone ester diols, in particular hexane diol-1,6/butane diol-1,4-adipates and mixtures of hexane diol-1,6-polycarbonate and butane diol-1,4-adipate, and hexane diol polycarbonates containing adipic acid, or polycarbonates based on reaction products of hexane diol-1,6 with ε-caprolactone.

The above-mentioned relatively high molecular weight, substantially bifunctional polyhydroxy compounds having a molecular weight of from 550 to 10,000 are reacted with less than stoichiometric quantities, with respect to the OH groups, of a first diisocyanate which is any diisocyanate other than naphthylene-1,5-diisocyanate, for example aromatic, cycloaliphatic or aliphatic diisocyanates, such as phenylene-1,4-diisocyanate, toluylene-2,4- and/or -2,6-diisocyanate, diphenyl-4,4'-diisocyanate, diphenylether-4,4'-diisocyanate, diphenylmethane-4,4'- and/or 2,4'- and/or 2,2'-diisocyanates or halogen- or mono-bis-tetra-alkyl-$C_1$-$C_8$ alkyl derivatives thereof, for example 3,3'-dimethyl-4,4'-diisocyanatodiphenylmethane or 3,5-diethyl-3,5'-diisopropyl-diphenylmethane-4,4'- diisocyanate, dicyclohexyl-4,4'-diisocyanate or stereoisomeric dicyclohexylmethane-4,4'-diisocyanates or hexamethylene diisocyanate, lysinester diisocyanate or hexamethylene diisocyanate. The following are preferably used: diphenylmethane-4,4'- and/or 2,4'- and/or 2,2'-diisocyanates, toluylene-2,4- and/or 2,6-diisocyanates, isophorone diisocyanate, dicyclohexylmethane-4,4'-diisocyanate and hexane-1,6-diisocyanate. Diphenylmethane-4,4'-diisocyanate is most preferred.

The relatively high molecular weight dihydroxy compounds and these diisocyanates are reacted in a conventional manner to produce the OH prepolymer, at least in a predominant quantity, in OH:NCO ratios of $>1$, for example from 4:1 to 1.33:1, preferably from 3:1 to 1.5:1 and more preferably from 2.5:1 to 1.75:1. The reaction may take place in an independent previous stage, but it may also be carried out in a multistage reaction screw in the first parts of the reaction chamber before the further reaction with naphthylene-1,5-diisocyanate and with the chain lengthener mixture.

The naphthylene-1,5-diisocyanate may be added to the OH-prepolymer in excess quantities (with respect to the OH-prepolymer), in which case an NCO-prepolymer is formed which is further reacted with the chain lengthening mixture (C) to produce the polyurethane elastomer, or the naphthylene-1,5-diisocyanate may be reacted together with the diol/polyol chain lengthening agent mixture (C) according to the present invention and with the OH-prepolymer in a one-stage reaction to produce the polyurethane elastomer. In this later case, the naphthylene-1,5-diisocyanate is preferably reacted with the OH-prepolymer in quantities such that NCO prepolymers having NCO-contents of from 4 to 12% by weight of NCO, preferably from 5 to 10% of NCO are produced (or would be produced arithmetically if the one-stage reaction was taken to run via a prepolymer stage).

The chain lengthener mixtures (C) consist of a diol or diol mixtures and triols and/or higher functional polyols or mixtures thereof in specific quantity ratios. The synthesis according to this invention of thermoplastically processible polyurethanes having Shore hardnesses of from 80 to 99 Shore-A (70 Shore-D) may be achieved only by the combination according to this invention of diols and triols (or polyols) in specific quantity ratios, particularly in the case of medium rigid types (Shore-A range of from about 90 to about 96 Shore-A, 55 Shore-D). If hydroquinone-di-(β-hydroxyethylether) is used as an aromatic chain lengthener diol, this compound may be used as the only diol for the synthesis of the thermoplastically processible polyurethane elastomers, but the stated quantities of short-chain triol (and/or polyol), preferably trimethylol propane have to be added to the chain lengthener mixture. However, if butane diol-1,4 or hexane diol-1,6 are used as the chain lengthener diol, then they may be used only in a combination with one or more other chain lengthener diol(s), so-called co-diol(s), for example butane diol-1,4 together with hexane diol-1,6 and/or diethylene glycol and/or neopentyl glycol and/or ethane diol. Only with diol mixtures of this type is it possible to achieve the synthesis of thermoplastically processible, (medium rigid) polyurethane elastomers, in the case of alkylene diols combined with the quantities which are characterized according to the present invention of triols (and/or polyols), preferably trimethylol propane.

In the case of hydroquinone-di-($\beta$-hydroxyethylether), the use of a second chain lengthener diol, such as butane diol-1,4 or hexane diol-1,6 is not necessary, but neither is it detrimental. In the case of such aromatic chain lengtheners, such as hydroquinone-di-($\beta$-hydroxyethylether) or terephthalic acid-bis-hydroxyethylester or even cycloaliphatic diols, such as quinitol, adjustments without co-chain lengthener diol(s) are preferred.

In the diol/polyol chain lengthener mixture (C), from 70 to 92 equivalent %, preferably from 75 to 90 equivalent % of the OH-groups of the chain lengthener mixture (C) carrying hydroxy groups originate from diols, and from 30 to 8 equivalent % of the OH-groups originate from tri- and/or higher functional polyols. Alternatively stated, from 70 to 92 equivalent % of OH, i.e. from 70 to 92% of all the OH-groups of the chain lengthener, originate from diols; the corresponding 30 to 8% of all OH-groups originate from triols or polyols having a functionality higher than 3.

As already stated, in the case of the diols, hydroquinone-di-($\beta$-hydroxyethylether) may be used according to this invention as the only diol, whereas when, for example butane diol-1,4 or hexane diol-1,6 is used as the main component, diol mixtures must be used. These diol mixtures consist of at least half the equivalent % of OH of butane diol-1,4 or hexane diol-1,6 in addition to at least 15 equivalent % of OH to at the most half the equivalent % of OH of in each case other diols having a molecular weight range of from 62 to 500, preferably from 62 to 254, preferably straight- or branched-chain alkylene diols optionally containing ether and/or ester groups, more preferably hexane diol-1,6, butane diol-1,4, ethylene glycol, diethylene glycol and/or neopentyl glycol, but optionally also cycloalkylene diols, such as quinitol or of resorcinol-bis-hydroxyethylether or terephthalic acid-bis-hydroxyethylester. The quantity of co-diols which are used as the main component in addition to butane diol-1,4 or hexane diol-1,6 is complimented in the quantity of equivalent % of OH, in each case based on the above-mentioned total content of from 70 to 92 equivalent % OH of diols.

The triols and/or higher functional polyols in the chain lengthener mixture (C) are preferably triols, for example trimethylolethane, trimethylolpropane, hexane triols, glycerine, and trihydroxy-cyclohexanes, but trimethylolpropane is most preferred as triol. In addition to, or instead of the triols, higher functional polyols may be used, for example tetrols, pentols or hexols or mixtures thereof (for example the formitol mixtures), as they are produced by the aldol reaction of formaldehyde and by subsequent reduction, or mixtures of propoxylated sucrose with diols or triols, for example having a functionality of from 5 to 6. In this case, the relatively high molecular weight polyols are generally used in quantities of less than 15 equivalent % of the OH-groups in the chain lengthener mixture.

Of course, the conventional hydrolysis protection agents and UV stabilizers according to the prior art may be added to the polyurethane components. In many cases, it is advisable to add antioxidants, such as 2,6-di-tert-butyl-4-methylphenol, other sterically hindered phenols and/or organic phosphites and/or phosphonites and/or other conventional antioxidants singly or in admixture, in a quantity of from about 0.1 to 1.5% by weight, based on the thermoplastic polyurethane elastomer in order to stabilize the polyurethane. UV absorbers and light protection agents based on benztriazole, cyanacrylic acid ester, 2,2,6,6-tetra-alkyl-piperidine, 1,2,2,6,6-penta-alkyl-piperidine or benzophenone, as well as other types of UV absorbers may also be added singly or in admixture to the thermoplastic polyurethane. The hydrolysis protection agents are usually based on carbodiimide, urea, cyanate or oxazolidine. Small quantities of a copolymer or graft polymers corresponding to EP-PS 12343 and/or process auxiliaries based on acryl polymers preferably homo- or copolymers of methyl- and butyl-methacrylate and compounds such as are described in U.S. Pat. No. 4,179,479 may be added to the mixtures. Waxes and oils and also long-chain compounds having carboxyl, ester, amide, urethane and urea groups, corresponding to DE-OS No. 2,204,470 may be added, for example as mold release agents. It is also possible to use non-polar waxes, for example polyethylene waxes, in a relatively high proportion.

It is possible to use catalysts for the reaction between hydroxyl and isocyanate groups, preferably catalysts of the type known in polyurethane chemistry, for example tertiary amines, such as triethylamine, tetramethylethylenediamine, 1,4-diazabicyclo-(2,2,2)-octane, N,N-dimethyl-benzylamine, N-methyl-N-dimethylaminoethyl-piperazine, pentamethyl-diethylenetriamine, or Mannich bases which are known as catalysts, from secondary amines such as dimethylamine and aldehydes (formaldehyde) or ketones (acetone) and phenols, also sila-amides having carbon-silicon bonds, for example 2,2,4-trimethyl-2-silamorpholine and 1,3-diethylaminomethyl-tetramethyl-disiloxane. Organic metal compounds, in particular organic tin compounds may also be used according to the present invention as catalyst, for example tin-(II)-acetate, tin-(II)-ethylhexoate and tin-(IV)-compounds, for example dibutyltindichloride, dibutyltindilaurate, and dibutyltinmaleate. Other suitable catalysts are described in, for example, DE-OS No. 2,920,501. Moreover, antistatic agents, flameproofing agents (see for example DE-OS No. 3,113,385), fungistatically and bacteriostatically acting substances, and fillers such as barium sulphate, chalk, kieselguhr, diatomites, carbon black and dyes or glass fibers may be added. Silicone fluids or dimethyl polysiloxane/polyoxyalkylene compounds (polyether siloxanes) may also preferably be used as additives.

The quantities of reaction components are usually selected in the present process so that the NCO:OH ratio of 1,5-naphthylene-diisocyanate and the "first diisocyanate" which is used to form the OH prepolymer to the relatively high molecular weight, substantially bifunctional polyhydroxyl compounds and the chain lengthener mixtures (C) is usually from 0.95 to 1.15, preferably from 1.0 to 1.1.

The thermoplastic polyurethanes according to the present invention may be produced in multi-shaft reaction screws in a continuous multistage process by metering-in the components at different points of the reaction screw, the OH prepolymer being formed in the starting zones of the screw, according to DE-OS No. 2,302,564 or preferably in casting processes, as described in the following. The OH prepolymer may also be synthesized discontinuously in a multistage form and metered continuously into the reaction screw, or mixed continuously in a stirrer-equipped head with the other components (B) and (C) and then charged continuously or discontinuously onto a belt. The abovementioned products may be mixed in a pot instead of in a stirrer-equipped head, and then discharged into a Teflon-coated belt or onto, for example Teflon-coated sheets. As also stated in one example, the products may also be produced by a two-stage process as follows: the relatively high molecular weight polyol is prelengthened with, for example, diphenylmethane-4,4'-isocyanate to produce the OH prepolymer. A relatively small amount (for example ¼) of this OH prepolymer is reacted with all of the naphthylene-1,5-diisocyanate to produce an NCO prepolymer and is metered into a double shaft screw kneading machine, and the (smaller) part of the OH prepolymer and the chain lengthener mixture (C) are also metered in at the same or at a different charging point. After passing through the screw machine, the resulting elastomer is cast continuously onto a belt or is cooled in liquids. Instead of being mixed in a screw machine, the components may also be mixed in a stirrer-equipped head. Each of these processes which have been mentioned or conventional modifications of said processes may be used for the production according to this invention of the polyurethane elastomers.

Once the polyurethane elastomers have been produced and granulated, the further processing thereof is carried out via thermoplastic processing, for example by injection molding optionally followed by annealing of the moldings The thermoplastic polyurethanes which are produced according to this invention have a good elastic recovery, in particular even at elevated temperatures, such as at from 80° to 100° C. The compression set at 100° C. amounts to, for example from about 40 to 50% (determined after 24 hours, according to DIN 53 517). In comparison, thermoplasts based on MDI and butane diol-1,4 chain lengthening achieve values of elastic recovery of only about 60 to 70%, or poorer values. Due to their particularly good elastic recovery, the products of this invention are most suitable for seals which are used at elevated temperatures.

Figure 2:
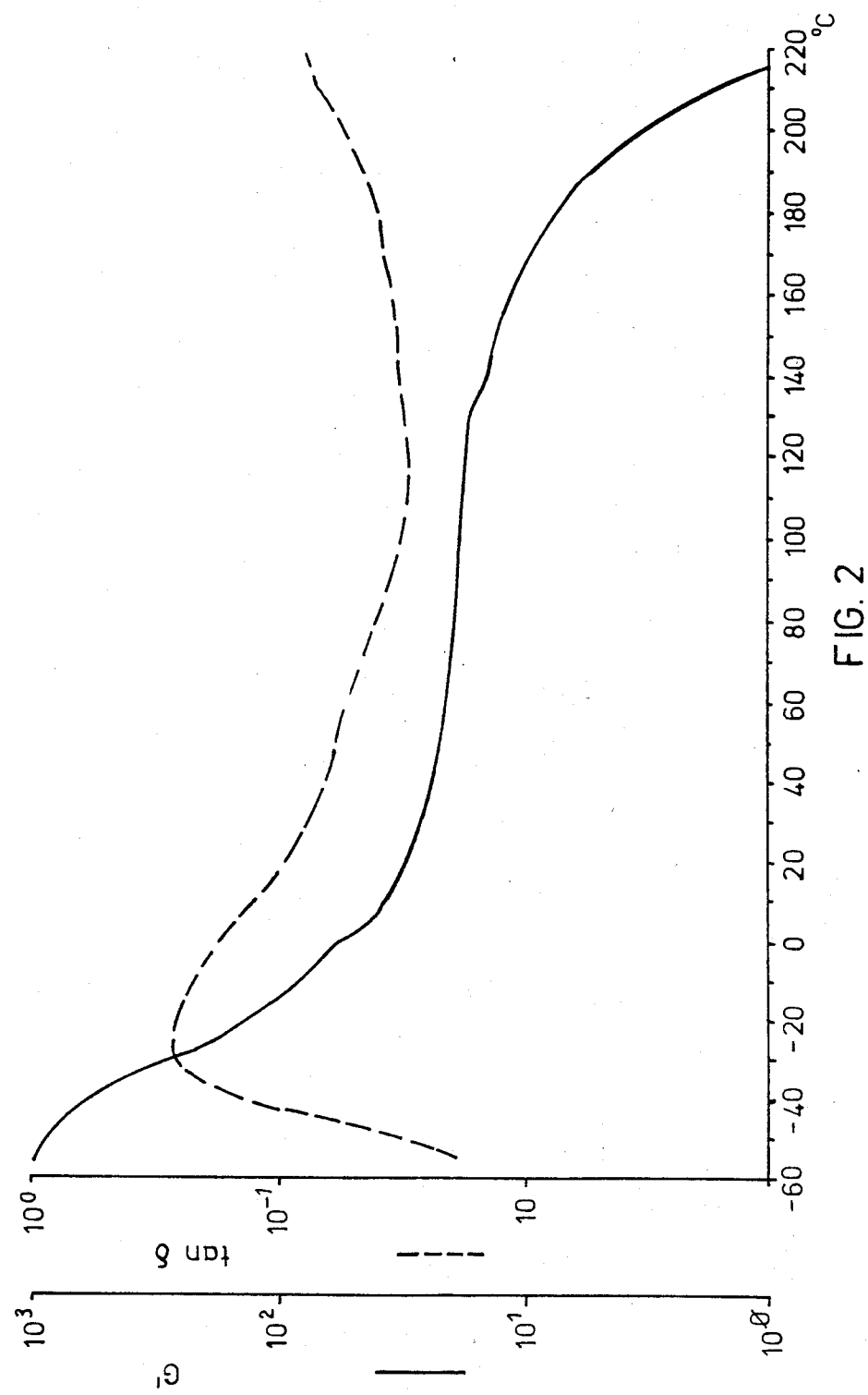
Figure 3:
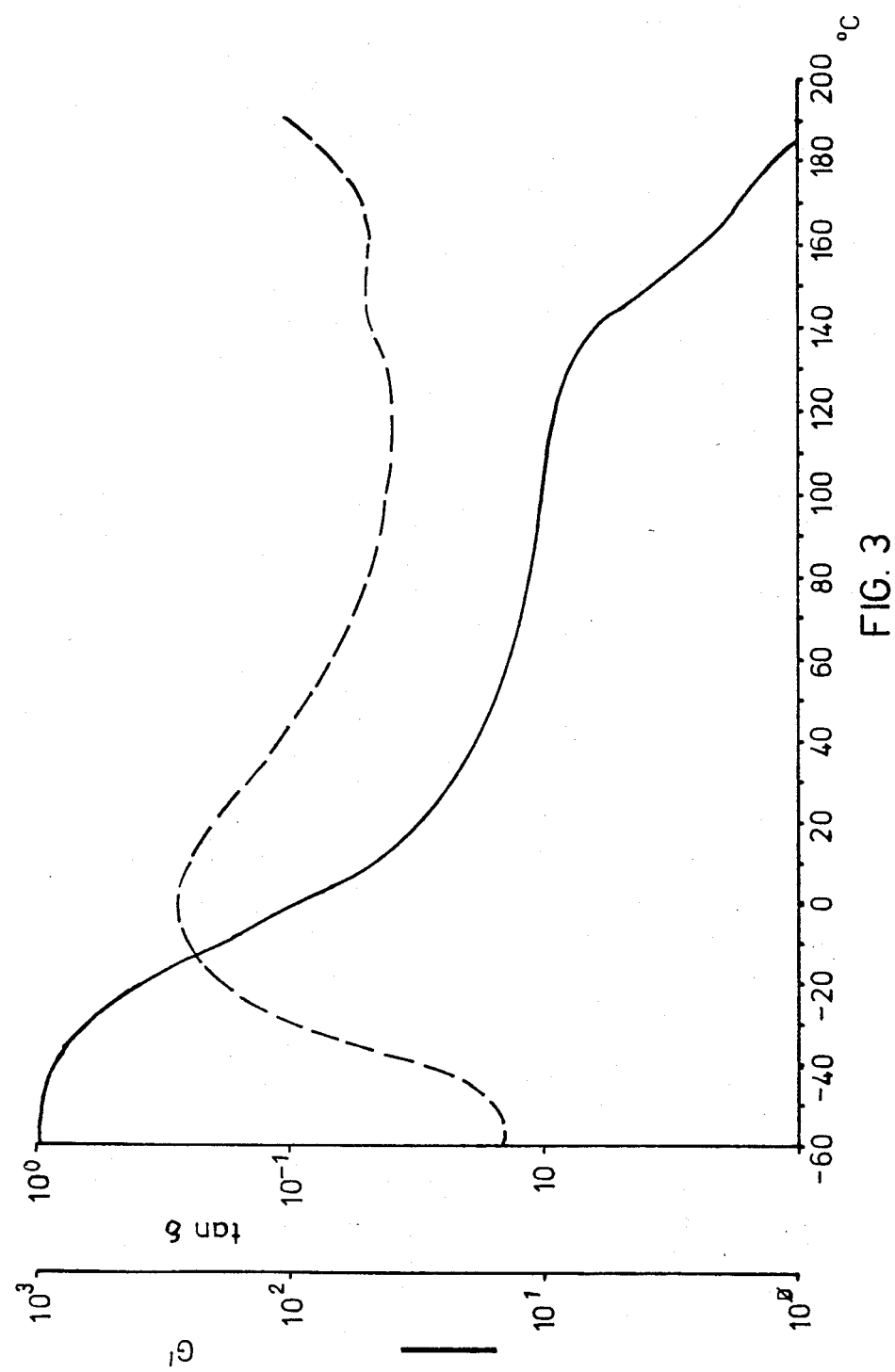

The shear modulus test shows a high dimensional stability under heat which is better than that of MDI-thermoplastic polyurethanes (with a comparable modulus) (see Examples 1A, 1B and Comparative Example 1.P, FIGS. 1 to 3). The dynamic property values are very good for polyurethane thermoplasts. Therefore, this material is also suitable for rollers which may be subjected to a high strain. Moreover, these products exhibit a high abrasion resistance and a low swelling under the effect of oil. The solvent resistance with respect to aliphatic and aromatic agents is very good.

The low temperature flexibility of these products is also better than that of thermoplastic polyurethanes based on MDI. The damping maximum of the product according to this invention is about −30° C., whereas the MDI type has its maximum at about 0° C. This gives the types of this invention an advantage of Δ30° C.

In the following examples, parts always signify parts by weight. In the case of the chain lengthening agents (diols and polyols), the quantity of the OH equivalents in the chain lengtheners is also stated in the form of OH equivalent percent (OH eq. %), which makes it possible to tell how many OH groups originate from diols and how many OH groups originate from higher functional triols and/or polyols. A corresponding conversion is given in Example Ia.

EXAMPLES

I. Casting Process

I(A) Chain lengthening with an alkylene diol mixture plus a triol

Mixture:

(a) 63.27 parts by weight of butane diol-1,4/hexane diol-1,6-adipic acid polyester, (OH Number 59): molar ratio of the diols B:H=70:30)

(b) 3.72 parts by weight of 4,4'-diisocyanatodiphenyl methane (MDI)

(OH:NCO ratio a:b=2.24:1)

(c) 0.51 parts by weight of stearylamide; 0.51 parts by weight of 2,2'-6,6'-tetraisopropyldiphenylcarbodiimide (d) 23.13 parts by weight of naphthylene-1,5-diisocyanate (NCO:OH ratio d):OH prepolymer=5.97:1

(e) chain lengthener mixture:

5.60 parts by weight of butane diol-1,4, (67.7 equivalent % OH)

1.90 parts by weight of hexane diol-1,6, (17.3 equivalent % OH)

1.26 parts by weight of trimethylolpropane (15.0 equivalent % OH).

The total NCO:OH ratio (b+d)/a+e) is 1.025:1.

The chain lengthener mixture, as designated under (e) consists of (assuming parts by weight=gram) 0.0632 mols of butane diol=0.1264 equivalents of OH groups=67.7 equivalent % of OH groups and 0.0161 mols of hexane diol-1,6, corresponding to 0.0322 equivalents of OH groups=17.3 equivalent % of OH in the mixture. The trimethylolpropane corresponds to 0.0094 mols=0.028 equivalents of OH groups=15.0 equivalent % of OH. The ratio of the OH groups of the alkylene diol mixture to OH groups of the trifunctional compound is, in this case, 85:15 equivalent % of OH groups.

The components (a) and (b) are pre-added to produce the OH prepolymer in a reactor at 120° C. with stirring over a period of 15 minutes (mol ratio of OH:NCO about 2:1). After the addition of (c) and after the mixture (a) to (c) has been heated to 145° C., the naphthylene diisocyanate (d) is added with stirring and reacted for about 10 minutes to produce the NCO prepolymer. The final temperature of the prepolymer mixture is about 130° C. The NCO prepolymer which has formed is reacted, with intensive stirring, with the chain lengthener mixture (e), which has been preheated to 60° C. After about 30 seconds, the reaction mixture is poured into a tank which is at a temperature of from 80° to 100° C. and has a Teflon lining, and the mixture is thoroughly heated for about one hour at from 100° to 110° C. The sheet which is obtained is cut into strips and is granulated. The polyurethane elastomer granulated material exhibits the properties which are described in Table 1 after being stored for two to three days, after being injected in an injection molding machine at about 240° C. and then after the moldings have been annealed (15 hours at 110° C.).

TABLE 1

Properties of the moldings produced from mixture 1A

| Test | Testing standard | Value | Unit of Measurement |
|---|---|---|---|
| Modulus 100% | DIN 53 504 | 12.3 | MPa |
| Modulus 300% | DIN 53 504 | 21.1 | MPa |
| Tensile strength | DIN 53 504 | 36.6 | MPa |
| Elongation at break | DIN 53 504 | 482 | % |
| Tear propagation resistance | DIN 53 515 | 62.5 | kN/m |
| Shore hardness A/D | DIN 53 505 | 92/38 | — |
| Elasticity | DIN 53 512 | 39 | % |
| compression set after 24 h at 100° C. | DIN 53 517 | 51.7 | % |
| Abrasion | DIN 53 516 | 28 | mm$^3$ |

1(B) Chain lengthening with hydroquinone-di-($\beta$-hydroxyethylether) and a trifunctional triol (trimethylolpropane)

Mixture:

(a) 66.52 parts by weight of butane diol-1,4/hexane diol-1,6-adipic acid polyester (OH No. 59) (see 1A,a)

(b) 3.92 parts by weight of 4,4'-diisocyanatodiphenylmethane (MDI) (OH:NCO ratio a:b=2.24:1)

(c) 0.53 parts by weight of stearylamide, and 0.53 parts by weight of 2,2'-6,6'-tetraisopropyl-diphenylcarbodiimide (d) 17.21 parts by weight of naphthylene-1,5-diisocyanate (NCO:OH ratio (NCO:OH prepolymer)=4.23:1, NCO content in the "NCO prepolymer"=6.0% of NCO)

(e) 9.97 parts by weight of hydroquinone-di-($\beta$-hydroxyethylether) (77.2 equivalent % of OH) 1.33 parts by weight of trimethylolpropane (22.8 equivalent % of OH)

The total NCO:OH ratio is 1.04:1.

Processing is carried out in a manner similar to that of the previous mixture, except that the chain lengthener mixture (e) is heated to a temperature of 115° C., and is added to the NCO prepolymer at this temperature. The mixture is further processed analogously to the process described under 1(A). The properties are given in Table 2.

TABLE 2

Properties of the thermoplastically processed PU-elastomer moldings acc. to 1B)

| Test | Testing standard | Value | Unit of Measurement |
|---|---|---|---|
| Modulus 100% | DIN 53 504 | 10.7 | MPa |
| Modulus 300% | DIN 53 504 | 18.1 | MPa |
| Tensile strength | DIN 53 504 | 25.4 | MPa |
| Elongation at break | DIN 53 504 | 428 | % |
| Tear propagation resistance | DIN 53 515 | 63.8 | kN/m |
| Shore hardness A/D | DIN 53 505 | 90/35 | — |
| Elasticity | DIN 53 512 | 42 | % |
| Compression set after 24 h at 100° C. | DIN 53 517 | 52.0 | % |
| Abrasion | DIN 53 516 | 26 | mm$^3$ |

EXAMPLES 1(C) to 1(K)

Thermoplastic polyurethanes according to the present invention are produced according to the formulations 1(C) to 1(K) stated in Table 3, the process being carried out as in Example 1(A) or 1(B). The experiments 1(C) to 1(E) are variations of the chain lengthener mixtures (e). In the Examples 1(F) to 1(I), the relatively high molecular weight polyester diol is varied. In the experiment 1(K), the diisocyanate was changed for the prelengthening of the OH prepolymer.

The polyurethane elastomers which are described in experiments 1(A) to 1(K) may be processed thermoplastically in conventional injection molding machines. In general, they have a good low temperature flexibility and considerably high heat distortion properties as for thermoplastic polyurethanes, at the same time with a high elasticity. This is represented by way of example for Examples 1A and 1B in FIG. (1) and in FIG. (2) by the curves of the shear modulus G' and the damping tan. $\delta$ (according to the torsional vibration/shear modulus) test in accordance with DIN 53 445) as a function of the temperature.

In comparison, a thermoplastic polyurethane based on 4,4'-diisocyanatodiphenylmethane (Comparative Example 1P) (FIG. 3) has a damping maximum of 0° C. compared to a damping maximum of $-30°$ C. in the case of the polyurethane elastomers according to the present invention, such as 1(A) or 1(B).

In the Comparative Example 1P (FIG. 3), the shear modulus remains horizontal only up to about 120° C., whereas the types of polyurethane elastomer according to the present invention based on naphthylene diisocyanate remain horizontal in their shear modulus curves up to 160° C.

The mixtures 1(L) to 1(O) are also Examples which are not according to the present invention. These mixtures cannot be processed thermoplastically in injection molding machines into perfect injection moldings. For example, injection moldings of this type exhibit cracks on their surfaces. In this case, it is possible to produce, at best, simple plates (partly inhomogeneous) only with great difficulty (narrow melting range, decomposition phenomenon), and the experiments are extremely difficult to reproduce (see Table 4). Experiments 1(L) and 1(M) are produced in a manner comparable to the mixture 1(A) according to the present invention. However, the Comparative Experiment 1(L) is carried out without trifunctional crosslinker polyol, and the Comparative Experiment 1(M) is carried out with only one alkylene diol (hexane diol-1,6) and trimethylol propane, but not, as required according to the present invention, in admixture with a second diol (for example butane diol-1,4).

The Comparative Experiments 1(M) and 1(O) correspond to the mixture 1(B) according to the present invention. However, the Comparative Experiment 1(N) is carried out without the short-chain trifunctional crosslinker (instead with a branched long-chain adipic acid ester), and the Comparative Experiment 1(O) is carried out with a diisocyanate, without OH prepolymer formation.

Table 3 gives the composition of Examples 1(C) to 1(K) and of the Comparative Experiments 1(L) to 1(O). The composition of Comparative Experiment 1(P) is based on diphenylmethane-4,4'-diisocyanate, corresponding to conventional thermoplastic elastomers.

In the experiment 1(Q) according to the present invention, a polyol mixture having OH number 380 and having a medium functionality of 5.8 was used as the polyol in the chain lengthener mixture. The polyol was produced by the joint propoxylation of sucrose, 1,2-propylene glycol and water up to the specified OH number. The number of OH groups in the starting components for the propoxylation reaction is as follows:

87.4 OH % from sucrose
6.4 OH % from 1,2-propylene glycol and,
6.2 OH % from water.

The elastomer 1(Q) which was obtained could be processed thermoplastically into perfect moldings.

TABLE 3

| | Component | 1.C. | 1.D. | 1.E. | 1.F. | 1.G. |
|---|---|---|---|---|---|---|
| Butanediol-1,4-adipate (OH No. 59) | a | | | | 59.45 | |
| Hexanediol-1,6-adipate (OH No. 55) | a | | | | | 66.06 |
| Butanediol-1,4-hexanediol-1,6-adipate (OH No. 59) | a | 66.49 | 59.07 | 62.46 | | |
| Hexanediol-1,6-polycarbonate (OH No. 56) | a | | | | | |
| Diethylene glycol adipate started partly with trimethylol | | | | | | |
| 4,4'-diisocyanato-diphenylmethane | b | 3.92 | 3.48 | 3.69 | 3.51 | 3.87 |
| 1,6-hexamethylene-diisocyanate | b | | | | | |
| Stearylamide | c | 0.53 | 0.47 | 0.50 | 0.59 | 0.98 |
| Carbodiimide (Ex. 1A) | c | 0.53 | 0.47 | 0.50 | 0.59 | 0.52 |
| 2,6-di-t-butyl-4-methylphenol | c | 0.13 | | 0.12 | 0.12 | 0.13 |
| Naphthylene-1,5-diisocyanate | d | 20.35 | 26.40 | 24.42 | 22.00 | 17.87 |
| Ethanediol | e | — | — | 2.50 (34.5) | — | — |
| Butanediol-1,4 | e | 3.32 (46.1) | 1.77 (21.2) | 5.62 (53.5) | 5.35 (67.7) | — |
| Hexanediol-1,6 | e | 3.32 (35.2) | 7.09 (64.6) | — | 1.78 (17.2) | — |
| Hydroquinone-di-β-hydroxyethylether | e | — | — | — | — | 9.84 (77.2) |
| Trimethylolpropane | e | 1.33 (18.7) | 1.18 (24.2) | 1.25 (12.0) | 1.19 (15.1) | 1.31 (22.8) |
| NCO:OH | | 1.03 | 1.00 | 1.03 | 1.05 | 1.03 |

| | | | | | (Comparative Experiments) | |
|---|---|---|---|---|---|---|
| | Component | 1.H. | 1.I. | 1.K. | 1.L. | 1.M. |
| Butanediol-1,4-adipate (OH No. 59) | a | | 31.31 | | | |
| Hexanediol-1,6-adipate (OH No. 55) | a | | | 66.89 | | |
| Butanediol-1,4-hexanediol-1,6-adipate (OH No. 59) | a | | | | 64.53 | 63.03 |
| Hexanediol-1,6-polycarbonate (OH No. 56) | a | 58.51 | 31.31 | | | |
| Diethylene glycol adipate started partly with trimethylol (OH No. 62) | | | | | | |
| 4,4'-diisocyanato-diphenylmethane | b | 3.45 | 3.69 | | 3.80 | 3.72 |
| 1,6-hexamethylene-diisocyanate | b | | | 2.66 | | |
| Stearylamide (additive) | c | 0.59 | 0.69 | 1.00 | 0.97 | 0.50 |
| Carbodiimide (Ex. 1A) | c | | 0.63 | 0.53 | 0.52 | 0.50 |
| 2,6-di-t-butyl-4-methylphenol | c | 0.12 | 0.13 | 0.13 | 0.13 | 0.13 |
| Naphthylene-1,5-diisocyanate | d | 22.24 | 23.48 | 18.09 | 23.60 | 22.04 |
| Ethanediol | e | — | — | — | — | — |
| Butanediol-1,4 | e | 5.27 (68) | 5.64 (68) | — | 5.80 (92.2) | — |
| Hexanediol-1,6 | e | 1.76 (17) | 1.88 (17) | — | 0.64 (7.8) | 8.82 (87.4) |
| Hydroquinone-di-β-hydroxyethylether | e | — | — | 9.97 (77.2) | — | — |
| Trimethylolpropane | e | 1.17 (15) | 1.25 (15) | 1.33 (28.8) | — | 1.26 (12.6) |
| NCO:OH | | 1.05 | 1.05 | 1.03 | 1.03 | 1.03 |

| | | (Comparative Experiments) | | | 1.Q. (according to present inv.) |
|---|---|---|---|---|---|
| | Component | 1.N. | 1.O. | 1.P. | |
| Butanediol-1,4-adipate (OH No. 59) | a | | | 65.51 | |
| Hexanediol-1,6-adipate (OH No. 55) | a | 34.53 | 66.00 | | |
| Butanediol-1,4-hexanediol-1,6-adipate (OH No. 59) | a | | | 52.94 | |
| Hexanediol-1,6-polycarbonate (OH No. 56) | a | | | | |

TABLE 3-continued

| | | | | | |
|---|---|---|---|---|---|
| Diethylene glycol adipate started partly with trimethylol (OH No. 62) | | 34.53 | | | |
| 4,4'-diisocyanato-diphenylmethane | b | | | 36.10 | 3.86 |
| 1,6-hexamethylene-diisocyanate | b | | | | |
| Stearylamide | c | 1.04 | 0.93 | 0.32 | 0.33 |
| Carbodiimide (Ex. 1A) | c | 0.35 | 0.53 | 0.53 | 0.65 |
| 2,6-di-t-butyl-4-methylphenol | c | 0.14 | 0.13 | 0.05 | 0.13 |
| Naphthylene-1,5-diisocyanate | d | 18.99 | 21.01 | — | 21.41 |
| Ethanediol | e | — | — | — | — |
| Butanediol-1,4 | e | — | — | 9.53 | 5.89 |
| Hexanediol-1,6 | e | — | — | — | 1.96 |
| Hydroquinone-di-β-hydroxyethylether | e | 10.36 (100) | 9.90 (77.2) | — | — |
| Trimethylolpropane | e | — | 1.32 (22.8) | — | 0.26 |
| NCO:OH | | 1.03 | 1.03 | | 1.03 |

Sugar polyol OH No. 380 Functionality 58

(o) Amount in parenthesis signifies equivalent % OH groups in the chain lengthening mixture.

TABLE 4

Properties of the thermoplastically processed polyurethane elastomers of Example 1C) to 1K) and Comparative Experiments 1L) to 1.O) (composition according to the details of Table 3)

| Test | Unit of Measurement | DIN Standard | 1.C. | 1.D. | 1.E | 1.F. | 1.G. | 1.H. | 1.J. | 1.K. | 1.L. | 1.M. | 1.N. | 1.O. |
|---|---|---|---|---|---|---|---|---|---|---|---|---|---|---|
| Modulus 100% | | 53 504 | 15.0 | 14.6 | 12.3 | 13.2 | 13.3 | 17.0 | 14.2 | 12.6 | cannot be processed thermoplastically into elastomers having good properties (measurable test bodies) | | | |
| Modulus 300% | MPa | 53 504 | 25.6 | 30.6 | 20.2 | 26.2 | 23.3 | 38.9 | 30.5 | 20.9 | | | | |
| Tensile strength | MPa | 53 504 | 29.4 | 53.7 | 45.5 | 66.3 | 39.6 | 68.0 | 62.7 | 38.5 | | | | |
| Elongation at break | % | 53 504 | 376 | 395 | 602 | 547 | 460 | 426 | 419 | 466 | | | | |
| Tear propagation resistance | kN/m | 53 515 | — | 73.5 | 73.3 | 92.2 | 70.0 | 92.6 | 67.6 | 72.2 | | | | |
| Shore hardness A/D | | 53 505 | 90/— | 95/43 | 92/40 | 92/42 | 90/— | 94/47 | 93/44 | 91/— | | | | |
| Elasticity | % | 53 512 | 41 | 35 | 39 | 39 | 35 | 33 | 36 | 35 | | | | |
| Pressure deformation residue 24 h/100° C. | % | 53 517 | 48 | 46 | 42.9 | 30.5 | 42.8 | 36.5 | 37.8 | 48.1 | | | | |
| Abrasion | | 53 516 | — | 27 | 26 | 26 | 19 | 28 | 22 | 29 | | | | |

II. Production of the Thermoplastic PU Elastomers According to the Present Invention in a Double Shaft Kneading Machine The operating method of a double shaft kneading machine (for example ZSK-53 manufactured by Werner and Pfleiderer, Stuttgart) is described in German Pat. Nos. 813,154: 862,668 and 940,109: in DE-OS No. 2,302,564 and in U.S. Pat. Nos. 3,233,025 and 3,642,964.

The residence time of the reaction melt in the screw machine is usually from 0.3 to 30 minutes, preferably from 0.5 to 4 minutes. The temperature of the screw housing is from about 60° to 300° C. (about 80° to 280° C. in the inlet zone; about 100° to 300° C. in the center of the extruder and about 120° to 250° C. in the discharge zone). The melt issuing from the extruder is cooled and crushed according to known processes. The products of the process may be processed thermoplastically in a conventional manner into moldings, such as toothed wheels, seals, etc.

The following Example illustrates the present invention. Unless otherwise indicated, amounts are to be understood as parts by weight. In the Example, a double shaft screw kneading press of the ZSK 53 V type manufactured by Werner and Pfleiderer, Stuttgart, having a self-cleaning shaft edging is used. The length of the processing part corresponds to about 20 times the shaft diameter.

A shaft edging having a kneading element part of about 20% is used for the Example. The processing part consists of 12 housings. The function and operating method of the screw machine, and of the kneading and conveying elements of the shaft edging, etc. are described in detail in the Werner and Pfleiderer company publications and in DE-AS No. 2,302,564.

The thermoplastic polyurethane is produced using the following starting materials in the specified parts by weight:

(a) 63.08 parts by weight of butane diol-1,4-hexane diol-1,6-adipic acid polyester (OH No. 59) (see 1A.a).

(b) 3.72 parts by weight of 4,4'-diisocyanato-diphenylmethane (c) 0.44% by weight of stearylamide (d) 0.50 parts by weight of 2,2'-6,6'-tetraisopropyldiphenylcarbodiimide 0.13 parts by weight of 2,6-di-tert.-butyl-4-methylphenol (e) 23.33 parts by weight of naphthylene-1,5-diisocyanate (f) chain lengthener mixture consisting of 5.67 parts by weight of butane diol-1,4 (67.7 equivalent % OH groups)

1.89 parts by weight of hexane diol-1,6 (17.2 equivalent % OH groups)

1.26 parts by weight of trimethylolpropane (15.1 equivalent % OH groups).

The total NCO:OH ratio is 1.03:1.

The components (a) and (b) are divided up in a ratio of 25:75 and are reacted at 130° C. in separate receiving reactors. After about 30 minutes, the components (d) are stirred into the reactor containing ¾ of the OH prepolymer. The component (e) is added in powder form to the ¼ of the OH prepolymer and reacted for one hour at 130° C. with stirring. The component (f) is in another receiving reactor at room temperature. The two prepolymer mixtures are metered into the housing 2 of the double shaft kneading machine by means of gear pumps. The component (b) is fed into the funnel, blanketed with nitrogen, at the beginning of the screw machine via a small reciprocating pump. The chain lengthener mixture component (f) is introduced into the housing 4 by means of a reciprocating pump.

The following housing temperatures are adjusted on the screw machine:

| Housing | 1 | 3 | 5 | 7 | 9 | 11 | 12 | Head |
|---|---|---|---|---|---|---|---|---|
| Temperature | 100 | 260 | 250 | 230 | 210 | 150 | 120 | 200° C. |

The thermoplastic polyurethane which is obtained exhibits the properties which are described in Table 5 after being stored for three days, injection molded in conventional injection molding machines and after the test bodies have been annealed (15 hours at 110° C.).

TABLE 5

Properties of the PU elastomer test bodies produced from mixture 2A

|  | Unit of Measurement | DIN Standard | Value |
|---|---|---|---|
| Modulus 100% | MPa | 53 504 | 11.2 |
| Modulus 300% | MPa | 53 504 | 22.4 |
| Tensile strength | MPa | 53 504 | 30.6 |
| Elongation at break | % | 53 504 | 375 |
| Tear propagation resistance | kN/m | 53 515 | 68.2 |
| Shore hardness A/D |  | 53 505 | 93/43 |
| Elasticity | % | 53 512 | 41 |
| compression set | % | 53 517 | 49.0 |
| 24 h at 100° C. |  |  |  |
| Abrasion | mm³ | 53 516 | 19 |

If aromatic diols are used as the chain lengthener mixtures (f) according to this Example, the inlet temperature for the mixture (f) must lie above the melting point of the aromatic diol.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a thermoplastically processible polyurethane elastomer comprising
   (i) reacting at least one substantially linear polyhydroxyl compound having a molecular weight of from about 550 to about 10,000 with a substoichiometric amount of at least one first diisocyanate to obtain an OH-prepolymer, and
   (ii) reacting said OH-prepolymer with a naphthylene-1,5-diisocyanate and a chain lengthener mixture, said first diisocyanate being any diisocyanate other than naphthylene-1,5-diisocyanate, said chain lengthener mixture being comprised of diols and polyols having molecular weights of from 62 to 500, said chain lengthener mixture being characterized in that between about 70 and about 92 equivalent percent of its OH groups are derived from said diols and in that between about 30 and about 8 equivalent percent of its OH groups are derived from polyols having a functionality of three and/or higher than three, said diols are being selected from the group consisting of hydroquinone-di-(β-hydroxyethylether), butane diol-1,4 and hexane diol-1,6, with the proviso that in mixtures containing either butane diol-1,4 or hexane diol-1,6 such mixtures contain co-diols which provide from about 15 to about 50 equivalent percent of said OH groups which are derived from diols only, said co-diols having a molecular weight of from 62 to 500.

2. The process of claim 1 wherein at least one member selected from the group consisting of antioxidants, UV absorbers, light protection agents, hydrolysis protection agents, mold release waxes, fillers and dyes is added.

3. The process of claim 1 wherein said first diisocyanate is a member selected from the group consisting of diphenylmethane diisocyanate, toluylene diisocyanate, dicyclohexylmethane diisocyanate and hexane diisocyanate.

4. The process of claim 1 wherein said OH prepolymer is characterized in that the ratio of OH:NCO thereof is from about 4:1 to about 1.33:1.

5. The process of claim 1 wherein said chain lengthener mixture comprises diols and polyols having molecular weights of from 62 to 254.

6. The process of claim 1 wherein said chain lengthener mixture is characterized in that between about 75 and about 90 equivalent percent of its OH groups are derived from said diols.

7. The process of claim 1 wherein said co-diols are straight or branched chain diols.

8. The process of claim 1 wherein said co-diols contain ether or ester groups having a molecular weight of from 62 to 254.

9. The process of claim 1 wherein said (i) is characterized in that said first diisocyanate is diphenylmethane-4,4'-diisocyanate and in that said polyhydroxyl compounds are reacted therewith in an OH:NCO ratio of from about 3:1 to about 1.5:1.

10. The process of claim 2 wherein said ratio is about 2.5:1 to about 1.75:1.

11. The process of claim 1 wherein said chain lengthener mixture is characterized in that between about 75 and about 90 equivalent percent of its OH groups are derived from said diols and about 25 to about 10 equivalent percent of its OH groups are derived from polyols having a functionality of three and/or higher than three.

12. The process of claim 4 wherein said ratio is from about 3:1 to about 1.5:1.

13. The process of claim 4 wherein said ratio is from about 2.5:1 to about 1.75:1.

14. The process of claim 1 further characterized in that said OH prepolymer is reacted with a sufficient amount of naphthylene-1,5-diisocyanate to produce an NCO-prepolymer containing from 4 to 12 percent by weight of NCO.

15. The process of claim 14 wherein said NCO-prepolymer contains from about 5 to about 10 percent by weight of NCO.

16. The process of claim 1 wherein said co-diols are aliphatic.

17. The process of claim 16 wherein said co-diol is selected from the group consisting of butane diol-1,4, hexane diol-1,6, ethane diol, diethylene glycol and neopentyl glycol.

18. The process of claim 1 wherein said chain lengthener mixture is characterized in that 75 to 90 equivalent percent of its OH groups are derived from a mixture of butane diol-1,4 and hexane diol-1,6 and in that 25 to 10 equivalent percent of OH groups are derived from triols.

19. The process of claim 1 wherein said chain lengthener mixture is characterized in that 75 to 90 equivalent percent of its OH groups are derived from hydroquinone-di-($\beta$-hydroxyethylether) and in that 25 to 10 equivalent percent of its OH groups are derived from triols.

20. The process of claim 1 wherein said polyol is trimethylol propane.

21. A thermoplastically processable polyurethane elastomer produced in accordance with the process of claim 1.

22. Injection molded articles comprising the polyurethane elastomer of claim 20.

* * * * *